US010754731B1

(12) United States Patent
Arumugam et al.

(10) Patent No.: US 10,754,731 B1
(45) Date of Patent: Aug. 25, 2020

(54) COMPLIANCE AUDIT LOGGING BASED BACKUP

(71) Applicant: Cohesity, Inc., San Jose, CA (US)

(72) Inventors: Adaikkappan Arumugam, Fremont, CA (US); Raghavendra Chowdary Maddipatla, Sunnyvale, CA (US); Prashant Pogde, Sunnyvale, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/452,326

(22) Filed: Jun. 25, 2019

(51) Int. Cl.
*G06F 11/14* (2006.01)
*G06F 16/11* (2019.01)

(52) U.S. Cl.
CPC ...... *G06F 11/1451* (2013.01); *G06F 11/1461* (2013.01); *G06F 16/128* (2019.01); *G06F 2201/84* (2013.01)

(58) Field of Classification Search
CPC ............. G06F 11/1451; G06F 11/1461; G06F 2201/84; G06F 16/11; G06F 16/113; G06F 16/122; G06F 16/128
See application file for complete search history.

(56) References Cited

U.S. PATENT DOCUMENTS

| 6,434,681 | B1 * | 8/2002 | Armangau | G06F 11/1466 711/162 |
| 6,981,114 | B1 * | 12/2005 | Wu | G06F 11/1469 711/112 |
| 8,412,688 | B1 * | 4/2013 | Armangau | G06F 16/128 707/695 |
| 9,697,268 | B1 * | 7/2017 | Prater | G06F 16/27 |
| 2004/0260726 | A1 * | 12/2004 | Hrle | G06F 11/1466 |
| 2007/0266062 | A1 * | 11/2007 | Young | G06F 11/1004 |
| 2008/0168567 | A1 * | 7/2008 | Hahn | G06F 21/6236 726/28 |
| 2014/0089264 | A1 * | 3/2014 | Talagala | G06F 3/065 707/649 |
| 2016/0364156 | A1 * | 12/2016 | Haustein | G06F 11/1458 |

* cited by examiner

*Primary Examiner* — James E Richardson
(74) *Attorney, Agent, or Firm* — Van Pelt, Yi & James LLP

(57) ABSTRACT

A compliance audit log of a data storage is obtained. The compliance audit log is analyzed to identify one or more files associated with a mounted storage volume that have changed since a previous backup snapshot of the mounted storage volume associated with the data storage. An incremental backup snapshot of the mounted storage volume is caused to be performed based on a result of the analysis of the compliance audit log.

17 Claims, 13 Drawing Sheets

COMPLIANCE AUDIT LOGGING BASED BACKUP

BACKGROUND OF THE INVENTION

A system may store a plurality of files. At a first point in time, a full backup of the system may be performed. The data associated with the plurality of files may be backed up to a storage system. The system may be backed up according to a backup schedule. At a second point in time, an incremental backup of the system may be performed. The number of files that have changed between the first point in time and the second point in time may be a small percentage (e.g., <1%) of the plurality of files stored by the system. Walking a filesystem of the system to identify the changed files may take a long time to perform because the system may store a large number of files (e.g., a million files, a billion files, etc.). This may cause latency in the incremental backup of the system.

BRIEF DESCRIPTION OF THE DRAWINGS

Various embodiments of the invention are disclosed in the following detailed description and the accompanying drawings.

DETAILED DESCRIPTION

Figure 1:
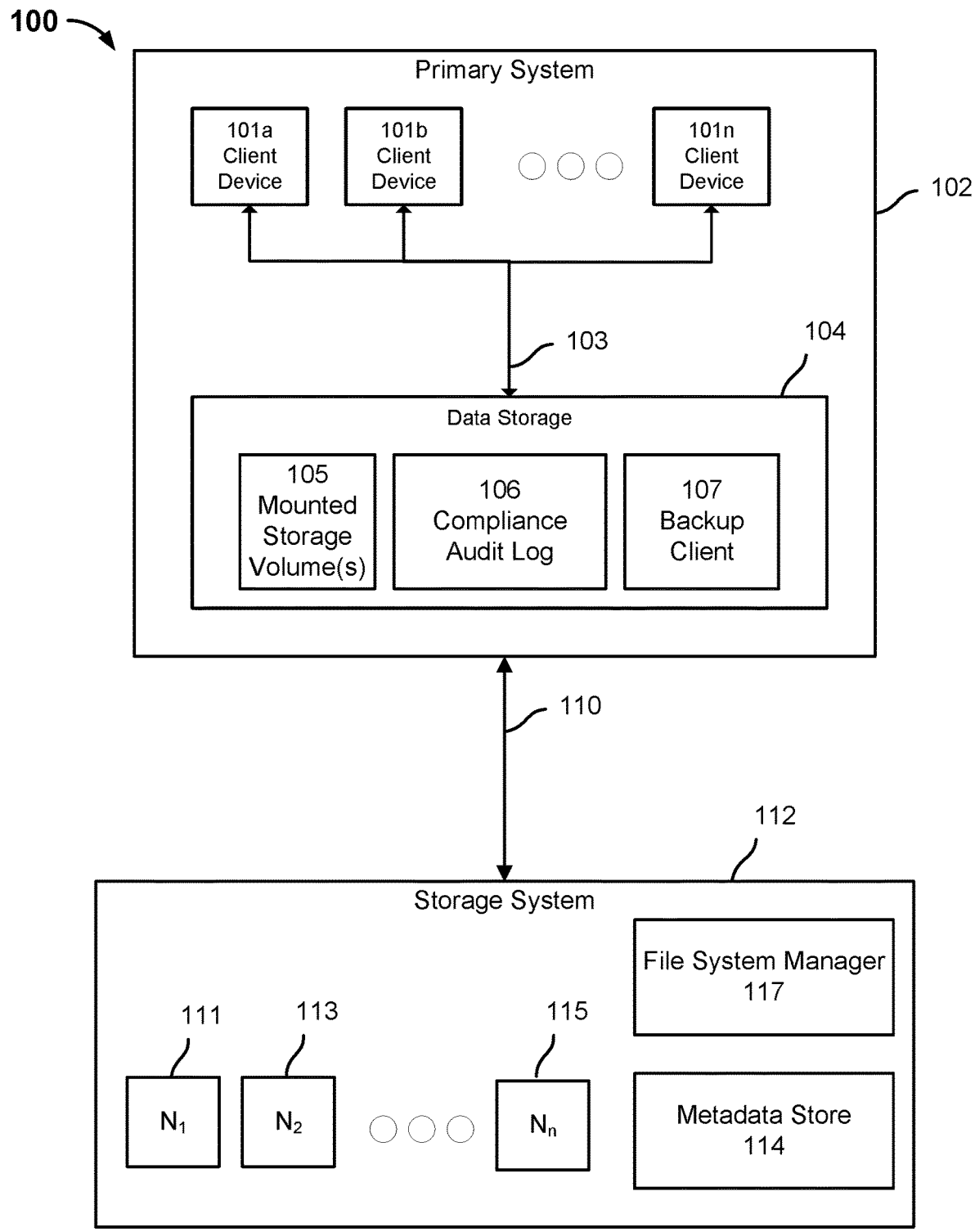
FIG. 1 is a block diagram illustrating a system for performing a backup in accordance with some embodiments.

A primary system may be comprised of a data storage (e.g., network-attached storage (NAS)), a computer network, and one or more client devices. The data storage may store a large number of files (e.g., millions, billions, etc.). Unlike systems that may keep track of changes to data via a change block tracker, the primary system may maintain an audit log to keep track of changes to the one or more files stored on the data storage. The primary system may maintain a compliance audit log for compliance purposes. For example, a financial institution may be required to maintain a compliance audit log for its data. To comply with regulations (e.g., Sarbanes-Oxley Act, Health Insurance Portability and Accountability Act, Gramm-Leach-Bliley Act, etc.), the primary system may be configured to update the compliance audit log anytime a file is accessed, modified, deleted, or created. An entry of the compliance audit log may include information, such as a timestamp, an event type (e.g., read, write, delete, etc.), a user associated with the event, file associated with the event, an identification of a device used, etc. The compliance audit log may include other information about the primary system, such as when a user associated with the primary system has logged in, the number of failed login attempts associated with a device, the last time a software update was performed, the last time a password was changed, etc. The compliance audit log may have a format specific to the type of compliance audit that will be performed. The compliance audit log may be used by regulators to determine whether an entity associated with the primary system is complying with regulations.

The data storage may have a plurality of mounted storage volumes. The compliance audit log may include entries for each of the plurality of mounted storage volumes. An entry may identify the mounted storage volume to which it is associated.

A backup client associated with a storage system may be installed on the data storage. The backup client may cause the primary system to perform a backup snapshot of the data associated with the plurality of files associated with one of the mounted storage volumes of the data storage. In some embodiments, the backup snapshot is a full backup snapshot of a mounted storage volume, which includes all of the data associated with the plurality of files associated with the mounted storage volume stored on the data storage. In other embodiments, the backup snapshot is an incremental backup snapshot of a mounted storage volume, which includes the data associated with one or more files that have changed since a previous backup snapshot and/or data associated with one or more files that were not included in the previous backup snapshot (e.g., a new file has been added to the data storage since the previous backup snapshot).

The one or more files that have changed since a previous backup snapshot of a mounted storage volume may be determined by walking the entire filesystem associated with the mounted storage volume. This may take a long time to perform because the data storage may be storing a large number of files (e.g., millions, billions, etc.). This may introduce a certain amount of latency in the incremental backup snapshot process because it may take a long time to identify the one or more files that are to be included in the incremental backup snapshot.

The amount of latency associated with an incremental backup snapshot may be reduced by obtaining the compliance audit log associated with the data storage. The compliance audit log may include a list of all of the file operations associated with the data storage and a corresponding timestamp associated with the file operations. The compliance audit log may be analyzed to identify the one or more files that are associated with a mounted storage volume to be backed up and have changed since a previous backup snapshot. In some embodiments, a storage system to which the one or more files are to be backed up, may remotely access the compliance audit log to identify the one or more files that are associated with a mounted storage volume to be backed up and have changed since the previous backup snapshot. The storage system may send to the backup client associated with the storage system a request for the one or more identified files. In some embodiments, the backup client associated with the storage system may access the compliance audit log to identify the one or more files that are associated with a mounted storage volume to be backed up and have changed since the previous backup snapshot.

The backup client associated with the storage system may cause the primary system to perform an incremental backup snapshot to include the data associated with the one or more identified files. This may reduce the amount of latency because the amount of time needed to analyze the compliance audit log to identify the one or more files is less than the amount of time needed to walk the entire filesystem associated with the mounted storage volume to be backed up to identify the one or more files. In an example, a mounted storage volume of the data storage may be comprised of a billion files and less than 1% of the files have changed since a previous backup. The amount of time needed to obtain the compliance audit log and analyze the compliance audit log to identify the less than 1% of files that have changed since a previous backup is less than the amount of time needed to walk the entire filesystem associated with the mounted storage volume to be backed up to identify the less than 1% of files that have changed since a previous backup.

The data associated with the one or more identified files may be sent from the primary system to a storage system. The storage system may already be storing some of the data associated with the one or more identified files because data associated with the one or more identified files was previously sent in a previous backup snapshot. The storage system may ingest the data associated with the one or more identified files and determine the data associated with the one or more identified files that is already stored by the storage system. Instead of storing a duplicate copy of the data, the storage system may store a reference to the duplicate data. The storage system may store the data associated with the one or more identified files that has not already been stored by the storage system.

FIG. 1 is a block diagram illustrating a system for performing a backup in accordance with some embodiments. In the example shown, system 100 is comprised of primary system 102, network 110, and storage system 112.

Primary system 102 may be comprised of a plurality of client devices 101a, 101b, 101n, a network 103, and a data storage 104. Although three client devices are shown, primary system 102 may be comprised of one to n client devices. A client device may be a computing device, such as a computer, a laptop, a desktop, a tablet, a mobile device, etc. Client devices 101a, 101b, 101n may store one or more files to data storage 104. Client devices 101a, 101b, 101n may access the one or more files stored in data storage 104 and perform one or more file operations with respect to the one or more files stored in data storage 104. A file operation may include a write operation, a read operation, and a delete operation.

Client devices 101a, 101b, 101n may be connected to data storage 104 via network 103. Network 103 may be a local area network, a wide area network, a personal area network, a wireless local area network, a storage-area network, etc.

Data storage 104 may be comprised of one or more data storage servers (not shown). Data storage 104 may be configured to provide file-based data storage services to client devices 101a, 101b, 101n. For example, data storage 104 may be a NAS. Data storage 104 may include one or more mounted storage volumes 105, compliance audit log 106, and backup client 107. The one or more mounted storage volumes 105 may store the data associated with one or more files and the metadata associated with the one or more files. Compliance audit log 106 may include a plurality of entries for the one or more mounted storage volumes. An entry may identify the mounted storage volume to which the entry is associated. Compliance audit log 106 may include an entry each time a file stored in the one or more mounted storage volumes 105 is accessed, modified, or deleted. Compliance audit log 106 may also include an entry each time a file is added to data storage 104 (e.g., a new file is stored in the one or more mounted storage volumes 105). Each entry of compliance audit log 106 may include an associated timestamp. Data storage 104 may maintain a corresponding compliance audit log for each storage device of data storage 104.

Backup client 107 may cause primary system 102 to perform a backup snapshot and send to storage system 112 the data associated with one or more files in the one or more mounted storage volumes 105. The backup snapshot may be a full backup snapshot or an incremental backup snapshot. A full backup snapshot may include all of the file system data associated with a mounted storage volume. The file system data may include all of the data associated with the plurality of files associated with a mounted storage volume. An incremental backup snapshot may include the file system data associated with a mounted storage volume that has not been backed up. The file system data may include the data associated with one or more files that have been modified and/or added to a mounted storage volume since a previous backup snapshot. In some embodiments, the incremental backup snapshot includes the data associated with an entire file, regardless if portions of the file have been previously backed up. In some embodiments, the incremental backup snapshot includes data associated with a portion of the file, the portion of the file corresponding to data that has not been previously backed up.

Backup client 107 may receive from storage system 112 a command to perform a backup snapshot. The command may be a command to perform a full backup snapshot of a mounted storage volume or a command to perform an incremental backup snapshot of a mounted storage volume. In response to receiving the command, backup client 107 may be configured to cause data storage 104 to send to storage system 112 the data associated with the requested backup snapshot.

For a full backup snapshot, backup client 107 may be configured to cause data storage 104 to send all of the file system data associated with a mounted storage volume. For an incremental backup snapshot, backup client 107 may be configured to cause data storage 104 to send the file system data associated with a mounted storage volume that has not been backed up.

In some embodiments, instead of walking an entire filesystem associated with a mounted volume, storage system 112 may remotely access compliance audit log 106 and analyze compliance audit log 106 to identify the one or more files associated with a mounted volume that have been modified and/or added since a previous backup snapshot. In some embodiments, instead of walking an entire filesystem associated with a mounted storage volume, backup client 107 may obtain compliance audit log 106 to identify the one or more files associated with a mounted storage volume that have been modified and/or added since a previous backup snapshot. This may reduce the amount of latency with performing an incremental backup snapshot of a mounted storage volume because the amount of time needed to identify the one or more files associated with a mounted storage volume that have been modified and/or added since a previous backup snapshot by analyzing compliance audit log 106 is less than the amount of time needed to identify the one or more files associated with a mounted storage volume that have been modified and/or added since a previous backup snapshot by walking the entire filesystem associated with the mounted storage volume.

A previous backup snapshot (full or incremental) has an associated timestamp. In the event an entry has a timestamp that is later in time than the timestamp associated with the previous backup snapshot, the file associated with the entry is determined to have been modified and/or added since a previous backup snapshot. In the event an entry has a timestamp that is not later in time than the timestamp associated with the previous backup snapshot, the file associated with the entry is determined not to have been modified and/or added since a previous backup snapshot.

In some embodiments, storage system 112 analyzes the entries of compliance audit log 106 to identify the one or more files associated with a mounted storage volume that have been modified or added since a previous backup snapshot based on a timestamp associated with an entry. Storage system 112 may send to backup client 107 a request for the one or more identified files associated with the mounted storage volume. In response to the request, backup client 107 may instruct data storage 104 to include the data associated with the one or more identified files associated with the mounted storage volume in the incremental backup snapshot.

In other embodiments, backup client 107 analyzes the entries of compliance audit log 106 to identify the one or more files associated with a mounted storage volume that have been modified or added since a previous backup snapshot based on a timestamp associated with an entry. Backup client 107 may instruct data storage 104 to include the data associated with the one or more identified files associated with the mounted storage volume in the incremental backup snapshot.

In some embodiments, for the one or more files associated with a mounted storage volume that have been identified as being modified and/or added since a previous backup snapshot, storage system 112 verifies that the one or more identified files have been modified and/or added since a previous backup snapshot. Storage system 112 may use a distributed file system protocol (e.g., network file system) to read the metadata associated with the one or more identified files to verify that the one or more identified files associated with a mounted storage volume have been modified and/or added since a previous backup snapshot. Storage system 112 may use a distributed file system protocol (e.g., network file system) to read an inode associated with the file to verify that the one or more attributes associated with a file have been modified and/or added since a previous backup snapshot. In other embodiments, for the one or more files associated with a mounted storage volume that have been identified as being modified and/or added since a previous backup snapshot, backup client 107 verifies that the one or more identified files have been modified and/or added since a previous backup snapshot. Backup client 107 may read the metadata associated with the one or more identified files to verify that the one or more identified files have been modified and/or added since a previous backup snapshot. Backup client 107 may read an inode associated with the file to verify that the one or more attributes associated with a file have been modified and/or added since a previous backup snapshot.

For example, the metadata associated with a file may include a modification timestamp or a creation timestamp. In the event the modification time stamp associated with a file is after the timestamp associated with the previous backup snapshot, the file is verified as being modified since a previous backup snapshot. In the event the modification time stamp associated with a file is not after the timestamp associated with the previous backup snapshot, the file is not verified as being modified since a previous backup snapshot. In the event the creation time stamp associated with a file is after the timestamp associated with the previous backup snapshot, the file is verified as being created since a previous backup snapshot. In the event the creation time stamp associated with a file is not after the timestamp associated with the previous backup snapshot, the file is not verified as being created since a previous backup snapshot.

The data associated with the one or more identified files associated with a mounted storage volume may be sent to storage system 112. Storage system 112 is a storage system configured to ingest and store file system data received from primary system 102 via connection 110. Connection 110 may be a wired connection or a wireless connection. Connection 110 may be a LAN, WAN, intranet, the Internet, or a combination thereof. Storage system 112 may use a distributed file system protocol (e.g., network file system) to remotely access primary system 102 and its contents (e.g., one or more storage volumes 105, compliance audit log 106, etc.).

Storage system 112 may be comprised of one or more storage nodes 111, 113, 115. Each storage node may include a corresponding processor and a plurality of storage tiers. For example, a high performance storage tier may be comprised of one or more solid state drives (SSDs) and a non-high performance storage tier may be comprised of one or more hard disk drives (HDDs). The storage associated with the high performance storage tier may be faster than the storage associated with one or more other storage tiers. The metadata associated with a plurality of files may be stored in the high performance storage tier (e.g., the one or more SSDs) of storage system 112 while the data associated with the plurality of files may be stored in either the high performance storage tier or non-high performance storage tier (e.g., the HDDs or SSDs) of storage system 112. The file system data included in a backup snapshot associated with a mounted storage volume may be stored in one or more of the storage nodes 111, 113, 115. In some embodiments, the one or more storage nodes store one or more copies of the file system data. In one embodiment, storage system 112 is comprised of one solid state drive and three hard disk drives. In some embodiments, the metadata associated with the plurality of files and the data associated with the plurality of files are stored in a plurality of storage tiers. Storage system 112 may receive one or more file operation requests (e.g., read, write, delete) for data associated with the plurality of files. The metadata associated with the plurality of files may be stored in the high performance storage tier of storage system 112 to enable a processor of storage system 112 handling the request to quickly locate the data associated with a file. In other embodiments, storage system 112 is comprised of one or more virtual storage nodes that are operating in a cloud environment (e.g., public cloud, private cloud). Each virtual storage node may have a corresponding amount of storage.

Storage system 112 may include file system manager 117. File system manager 117 may be configured to organize in a tree data structure the file system data received in a backup snapshot associated with a mounted storage volume from primary system 102. An example of the tree data structure is a file system metadata snapshot tree (e.g., Cohesity Snaptree®), which may be based on a B+ tree structure (or other type of tree structure in other embodiments). The tree data structure provides a view of the file system data corresponding to a backup snapshot associated with a mounted storage volume. The view of the file system data corresponding to the backup snapshot associated with a mounted storage volume may be comprised of a file system metadata snapshot tree and a plurality of file metadata structures. A file metadata structure may correspond to one of the files included in the backup snapshot. The file metadata structure is configured to store the metadata associated with the file. File system manager 117 may be configured to perform one or more modifications, as disclosed herein, to a file system metadata snapshot tree and a file metadata structure.

The file system metadata snapshot tree and file metadata structures may be stored in metadata store 114. Metadata store 114 may store the view of file system data corresponding to a backup snapshot associated with a mounted storage volume. Metadata store 114 may also store data associated with content files that are smaller than a limit size (e.g., 256 kB). Metadata store 114 may be stored across the high performance storage tier of storage nodes 111, 113, 115. Metadata store 114 may be distributed across storage nodes 111, 113, 115, that is, storage nodes 111, 113, 115 may store at least a portion of metadata store 114. In some embodiments, metadata store 114 is stored on one of the storage nodes 111, 113, 115. Metadata store 114 may be stored in the solid state drives of storage system 112, the one or more hard disk drives of storage system 112, and/or a combination thereof. Metadata store 114 may be configured to store the metadata associated with primary system 102 that is included in a backup snapshot. Metadata store 114 may be configured to store the metadata associated with a plurality of content files stored on storage system 112. For example, metadata store 114 may store the view of file system data corresponding to a backup snapshot (e.g., a snapshot tree and one or more file metadata structures).

Metadata store 114 may be configured to store the key-value pairs associated with a snapshot tree and/or file metadata structure. A key-value pair may be stored in a plurality of the storage nodes 111, 113, 115 (e.g., duplicate copies) to provide fault tolerance. One of the storage nodes may be a primary storage node for a key-value pair and one or more other storage nodes may be a secondary storage node for the key-value pair. In the event the primary storage node goes offline, one of the secondary storage nodes for the key-value pair may be online and storing a copy of the key-value pair. In the event storage system 112 receives a request for the key-value pair and the primary storage node for the key-value pair is offline, one of the secondary storage nodes for the key-value pair may be able to fulfill the request.

The tree data structure may be used to capture different versions of backup snapshots associated with a mounted storage volume. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot associated with a mounted storage volume may reference an intermediate node or leaf node of a first file system metadata snapshot tree corresponding to a first backup snapshot associated with the mounted storage volume.

A file system metadata snapshot tree is a representation of a fully hydrated backup because it provides a complete view of the storage volume(s) at a particular moment in time. A fully hydrated backup is a backup that is ready for use without having to reconstruct a plurality of backups to use it. Other systems may reconstruct a backup by starting with a full backup and applying one or more changes associated with one or more incremental backups to the data associated with the full backup. In contrast, any file associated with a mounted storage volume at a particular time and the file's contents, for which there is an associated backup snapshot, may be determined from the file system metadata snapshot tree, regardless if the associated backup snapshot was a full backup snapshot or an incremental backup snapshot. Creating an incremental backup snapshot may only include copying data of a mounted storage volume that was not previously backed up. However, the file system metadata snapshot tree corresponding to the incremental backup snapshot provides a complete view of the mounted storage volume at the particular moment in time because it includes references to data of the mounted storage volume that was previously stored. For example, a root node associated with the file system metadata snapshot tree may include one or more references to leaf nodes associated with one or more previous backup snapshots associated with a mounted storage volume and one or more references to leaf nodes associated with the current backup snapshot associated with the mounted storage volume. This provides significant savings in the amount of time needed to restore or recover a mounted storage volume and/or a database. In contrast, other recovery/restoration methods may require significant time, storage, and computational resources to reconstruct a particular version of a volume or database from a full backup and a series of incremental backups.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata structure (e.g., Blob structure), or a pointer to a data chunk stored on the storage system. Storage system 112 may store a set of one or more file system metadata snapshot trees. Each file system metadata snapshot tree may correspond to a particular moment in time associated with a state of a mounted storage volume of primary system 102.

Data associated with a file that is smaller than or equal to a limit size (e.g., 256 kB) may be stored in a leaf node of the file system metadata snapshot tree. A leaf node may be an index node (inode). A file metadata structure may be generated for a file that is larger than the limit size. The file metadata structure is configured to store the metadata associated with a version of a file.

The file metadata structure may include a root node, one or more levels of one or more intermediate nodes associated with the root node, and one or more leaf nodes associated with an intermediate node of the lowest intermediate level. The tree data structure associated with a file metadata structure allows a chain of file metadata structures corresponding to different versions of a file to be linked together by allowing a node of a later version of a file metadata structure to reference a node of a previous version of a file metadata structure. For example, a root node or an intermediate node of a second file metadata structure corresponding to a second version of a file may reference an intermediate node or leaf node of a first file metadata structure corresponding to a first version of the file. A file metadata structure may be associated with a plurality of chunk files. A chunk file may be comprised of a plurality of file segment data chunks. Storage system 112 may store a set of one or more file metadata structures. Each file metadata structure may correspond to a file.

A leaf node of a file metadata structure may store a value, such as an identifier of a data brick associated with one or more data chunks. For example, a file metadata structure may correspond to a file and a leaf node of the file metadata structure may include a pointer to or an identifier of a data brick associated with one or more data chunks of the file. A data brick may be associated with one or more data chunks. In some embodiments, the size of a brick is 256 kB. The one or more data chunks may be of variable length within a particular range (e.g., 4 kB to 64 kB).

The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The chunk metadata table and the chunk file metadata table may be used, based on a brick identifier, to locate the data chunks associated with a file corresponding to a file metadata structure. A snapshot tree and a file metadata structure may be traversed to a leaf node of the file metadata structure to identify a brick identifier (e.g., the value stored by a leaf node of the file metadata structure). The chunk metadata table and the chunk file metadata table may be retrieved from metadata store 114. The brick identifier in combination with the chunk metadata table and the chunk file metadata table may be used to identify a location of one or more data chunks of the content file corresponding to the file metadata structure. For example, a brick identifier and the chunk metadata table may be used to identify a corresponding chunk identifier. The corresponding chunk identifier and the chunk file metadata table may be used to determine a location of one or more data chunks associated with the content file corresponding to the file metadata structure. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Metadata store 114 may store the view of file system data corresponding to a backup snapshot. Metadata store 114 may also store file metadata associated with a content file that is smaller than a limit size. Metadata store 114 may include a data structure (e.g., a map, a table, a list) that matches file trees to their corresponding portions of a large content file. For example, the metadata associated with a large content file may be stored across three file trees. Each file tree may correspond to an offset range of the large content file. The data structure may include an entry that associates a first offset range of the large content file with a first file tree, a second offset range of the large content file with a second file tree, and a third offset range of the large content file with a third file tree. Metadata store 114 may store a plurality of data structures that are configured to store different types of information (e.g., deduplication information, change file information, file table, chunk file metadata table, etc.).

Storage system 112 may receive an incremental backup snapshot from primary system 102. The incremental backup snapshot may include data associated with one or more files that were modified since a previous backup snapshot associated with a mounted storage volume. Storage system 112 may already be storing a portion of the data associated with a file. Storage system 112 may ingest the data associated with the one or more files included in an incremental backup snapshot associated with a mounted storage volume and divide the data associated with the one or more files into a plurality of data chunks. Storage system 112 may assign a corresponding chunk identifier to one of the data chunks. Storage system 112 may compare the corresponding chunk identifier to chunk identifiers included in the one or more data structures stored in metadata store 114. In the event the corresponding chunk identifier is not already stored in the one or more data structures, the data chunk is retained and the file metadata structure associated with the file may be updated to include a leaf node that stores a brick identifier associated with the corresponding chunk identifier. In the event the corresponding chunk identifier is already stored in the one or more data structures, the data chunk is discarded and the file metadata structure associated with the file may be updated to include a reference to a leaf node that stores a brick identifier that is associated with the chunk identifier. This may prevent duplicate copies of a data chunk from being stored on storage system 112 because instead of storing a duplicate copy of a data chunk, storage system 112 stores a reference to the duplicate data.

Figure 2A:
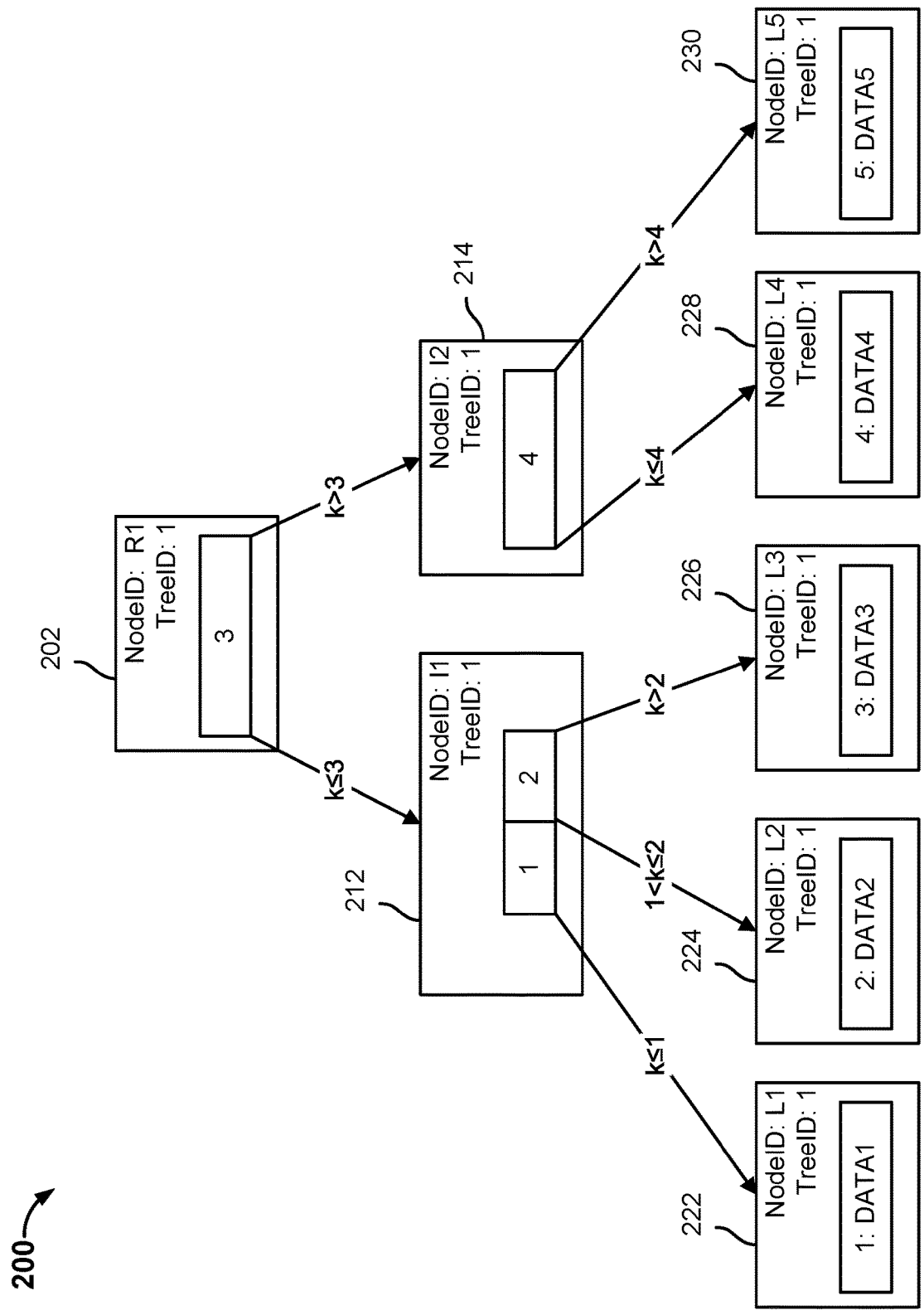
FIG. 2A is a block diagram illustrating an embodiment of a tree data structure.

FIG. 2A is a block diagram illustrating an embodiment of a tree data structure. A tree data structure may be used to represent the file system data that is stored in a storage system, such as storage system 112. The file system data may include metadata for a file system and may include information, such as the chunk identifier, chunk offset, file size, directory structure, file permissions, physical storage locations of the files, etc. A file system manager, such as file system manager 117, may generate tree data structure 200.

In the example shown, tree data structure 200 is comprised of a file system metadata snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time $t=t_0$. Tree data structure 200 may correspond to the file system data included in a full backup snapshot associated with a mounted storage volume. The backup snapshot may be received from a primary system, such as primary system 102. The file system metadata snapshot tree in conjunction with a plurality of file metadata trees may provide a complete view of the primary system associated with the backup snapshot for the particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node at the bottom of a file system metadata snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to look up "DATA1" of leaf node 222. The value associated with a leaf node may be a brick identifier. In some embodiments, the leaf node is configured to store file system metadata (e.g., chunk identifier (e.g., SHA-1 hash value, etc.), file size, directory structure, file permissions, physical storage locations of the files, etc.). A leaf node may store a data key k and a pointer to a location that stores the value associated with the data key. In other embodiments, a leaf node is configured to store the actual data when the file is less than or equal to a limit size. For example, data associated with a file that is less than or equal to 256 kB may reside in the leaf node of a file system metadata snapshot tree. In some embodiments, a leaf node includes a pointer to a file metadata tree (e.g., blob structure) when the size of the file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID may identify the name of the node. The TreeID may identify the view with which the node is associated. When a change is made to data stored in a leaf node as described with respect to FIGS. 2B, 2C, and 2D, the TreeID may be used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers to intermediate node 212. The first set of pointers associated with a data key less than or equal to the node key (e.g., "1", "2," or "3") indicates that traversing tree data structure 200 from root node 202 to intermediate node 212 may lead to a leaf node with a data key of "1," "2," or "3." Root node 202 includes a second set of pointers to intermediate node 214. The second set of pointers associated with a data key greater than the node key indicates that traversing tree data structure 200 from root node 202 to intermediate node 214 may lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 may lead to the node with a data key of "1." The pointer to leaf node 224 indicates that traversing tree data structure 200 from intermediate node 212 to leaf node 224 may lead to the node with a data key of "2." The pointer to leaf node 226 indicates that traversing tree data structure 200 from intermediate node 212 to leaf node 226 may lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 may lead to the node with a data key of "4." The pointer to leaf node 230 indicates that traversing tree data structure 200 from intermediate node 214 to leaf node 230 may lead to the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a file. In some embodiments, leaf node 222 is configured to store data associated with a file. In other embodiments, leaf node 222 is configured to store a pointer to a file metadata tree.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a file. In some embodiments, leaf node 224 is configured to store data associated with a file. In other embodiments, leaf node 224 is configured to store a pointer to a file metadata tree.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a file. In some embodiments, leaf node 226 is configured to store data associated with a file. In other embodiments, leaf node 226 is configured to store a pointer to a file metadata tree.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a file. In some embodiments, leaf node 228 is configured to store data associated with a file. In other embodiments, leaf node 228 is configured to store a pointer to a file metadata tree.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a file. In some embodiments, leaf node 230 is configured to store data associated with a file. In other embodiments, leaf node 230 is configured to store a pointer to a file metadata tree.

Figure 2B:
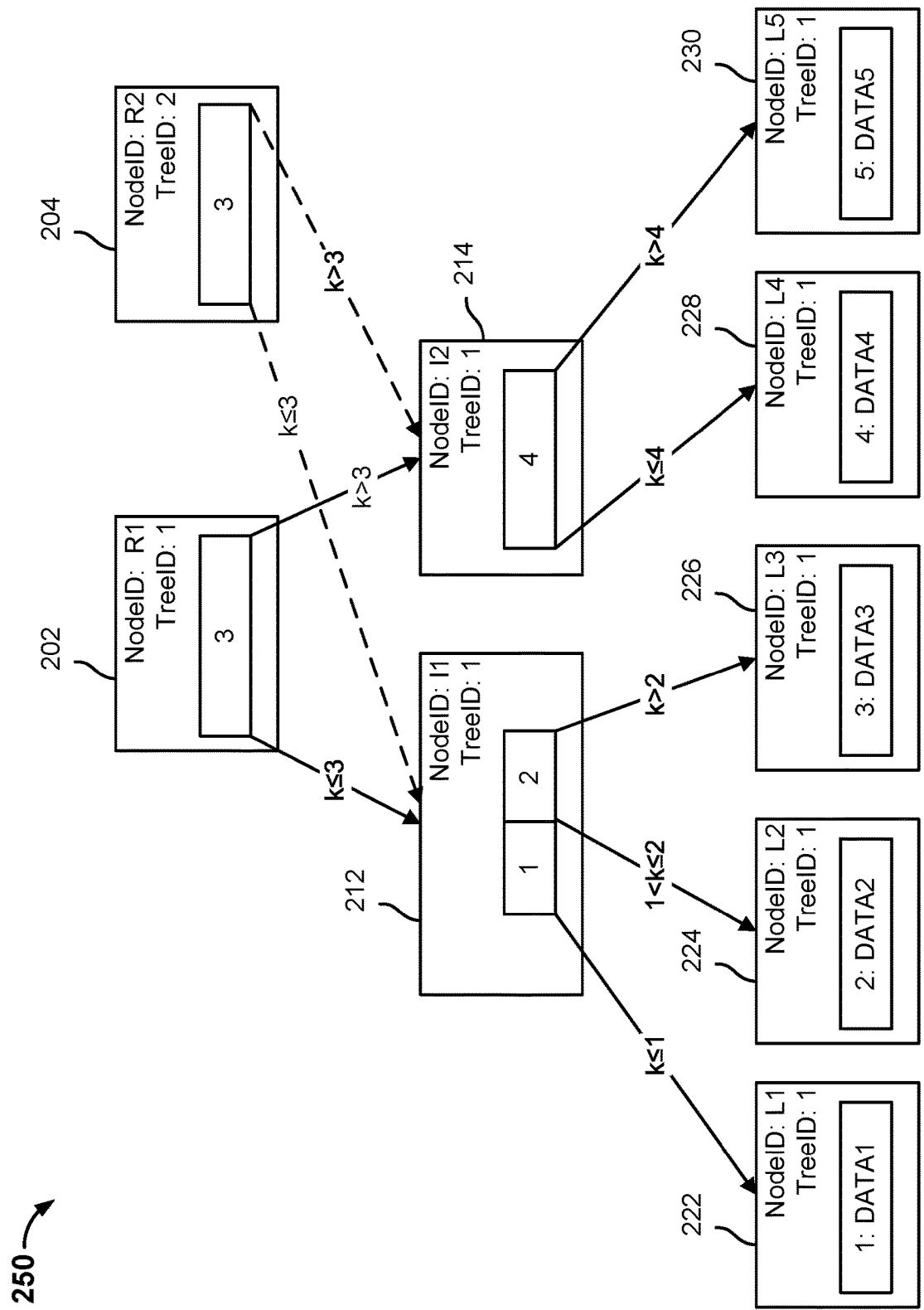
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure. In some embodiments, tree data structure 250 may be created by a storage system, such as storage system 112. The file system data of a mounted storage volume, such as one of the mounted storage volumes 105, may be included in a subsequent backup snapshot and backed up to a storage system, such as storage system 112. The subsequent backup snapshot associated with a mounted storage volume may correspond to an incremental backup snapshot. The manner in which the file system data corresponding to the subsequent backup snapshot associated with a mounted storage volume is organized in storage system 112 may be represented by a tree data structure. The tree data structure corresponding to the subsequent backup snapshot may be created by cloning a file system metadata snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of file system data associated with a mounted storage volume at a particular point in time, for example, $t=t_1$. The tree data structure can be used to capture different versions of file system data associated with a mounted storage volume at different moments in time. The tree data structure may also efficiently locate desired metadata by traversing a particular version of a file system metadata snapshot tree included in the tree data structure. In some embodiments, the tree data structure allows a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot associated with a mounted storage volume is performed, a new root node may be created by cloning the previous root node. The new root node may include the same set of pointers included in the previous root node, that is, the new root node of the snapshot may be linked to one or more intermediate nodes associated with a previous backup snapshot associated with a mounted storage volume. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a clone (e.g., a copy) of root node 202. Similar to root node 202, root node 204 includes the same pointers as root node 202. Root node 204 includes a first set of pointers to intermediate node 212 and a second set of pointers to intermediate node 214. Root node 204 includes a NodeID of "R2" and a TreeID of "2."

Figure 2C:
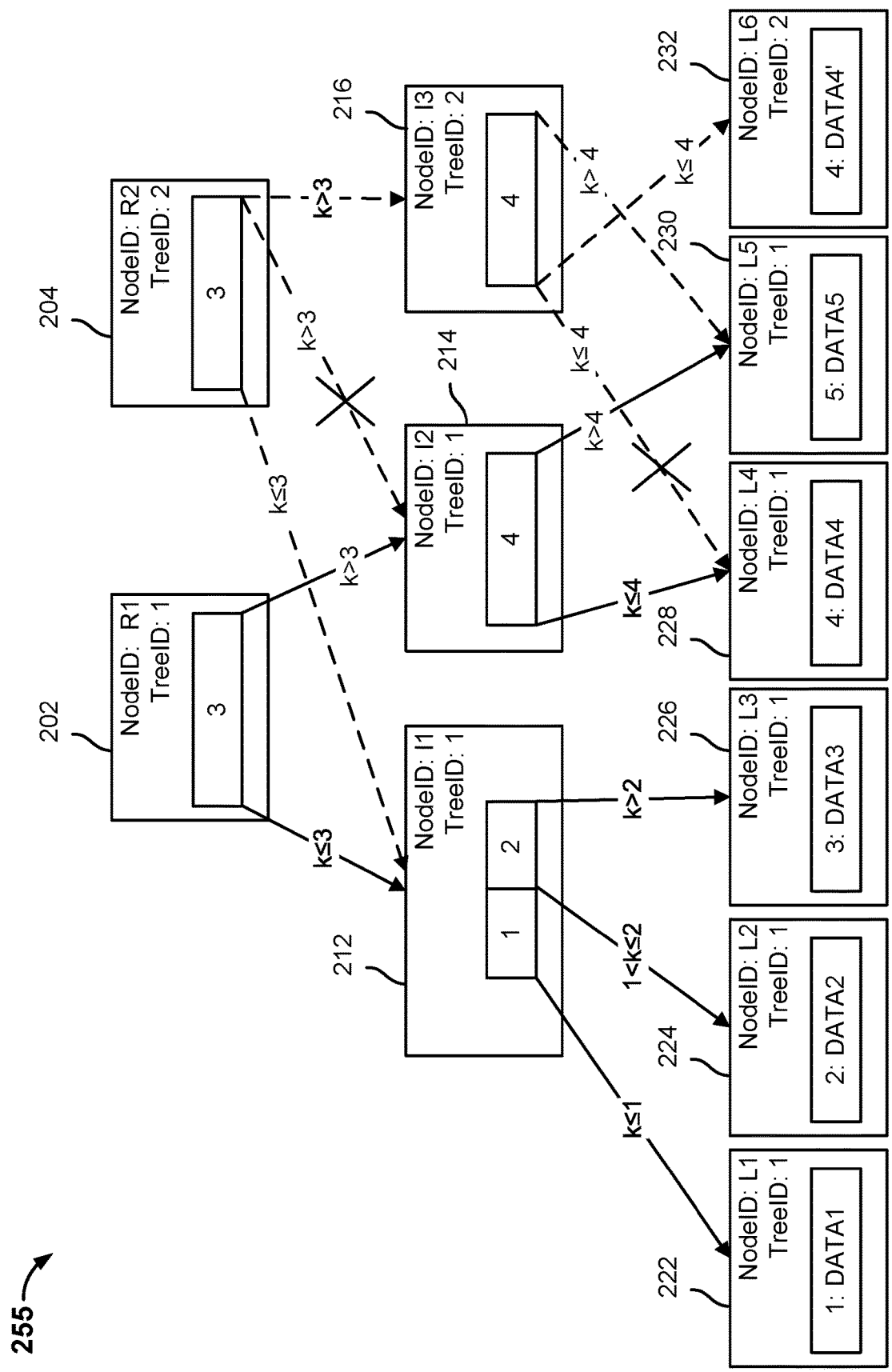
FIG. 2C is a block diagram illustrating an embodiment of modifying a cloned file system metadata snapshot tree.

FIG. 2C is a block diagram illustrating an embodiment of modifying a cloned file system metadata snapshot tree. In the example shown, tree data structure 255 may be modified by a file system manager, such as file system manager 117. A file system metadata snapshot tree with a root node 204 may be a current view of the file system data associated with a mounted storage volume at time $t=t_1$. A current view may represent a state of the file system data that is up-to-date and capable of receiving one or more modifications to the file system metadata snapshot tree that correspond to modifications to the file system data. Because a snapshot represents a perspective of the file system data that is "frozen" in time, one or more copies of one or more nodes affected by a change to file system data may be made.

The data stored by the storage system may be immutable. Previously stored data is not modified. Instead the file system metadata snapshot tree may be updated to reference new data.

In the example shown, the value "DATA4" has been modified to be "DATA4'." In some embodiments, the value of a key value pair has been modified. For example, the value of "DATA4" may be a pointer to a file metadata tree corresponding to a first version of a file and the value of "DATA4'" may be a pointer to a file metadata tree corresponding to the second version of the file. In other embodiments, the value of the key value pair is the data of metadata associated with a content file that is smaller than or equal to a limit size. In other embodiments, the value of the key value pair points to a different file metadata tree. The different file metadata tree may be a modified version of the file metadata tree to which the leaf node previously pointed.

To modify a file system metadata snapshot tree, the file system manager may start at root node 204 because that is the root node associated with the file system metadata snapshot tree at time t=2 (i.e., the root node associated with the last backup snapshot). The value "DATA4" is associated with the data key "4." The file system manager traverses file system metadata snapshot tree 255 from root node 204 until it reaches a target leaf node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager may update a pointer of root node 204 to point to intermediate node 216 instead of pointing to intermediate node 214. The file system manager may traverse tree data structure 255 from intermediate node 216 to leaf node 228, determine that the TreeID of leaf node 228 does not match the TreeID of root node 204, and create a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data of metadata associated with a file that is smaller than or equal to a limit size. In other embodiments, leaf node 232 stores a pointer to a file metadata tree corresponding to a file, such as a virtual machine container file.

Figure 2D:
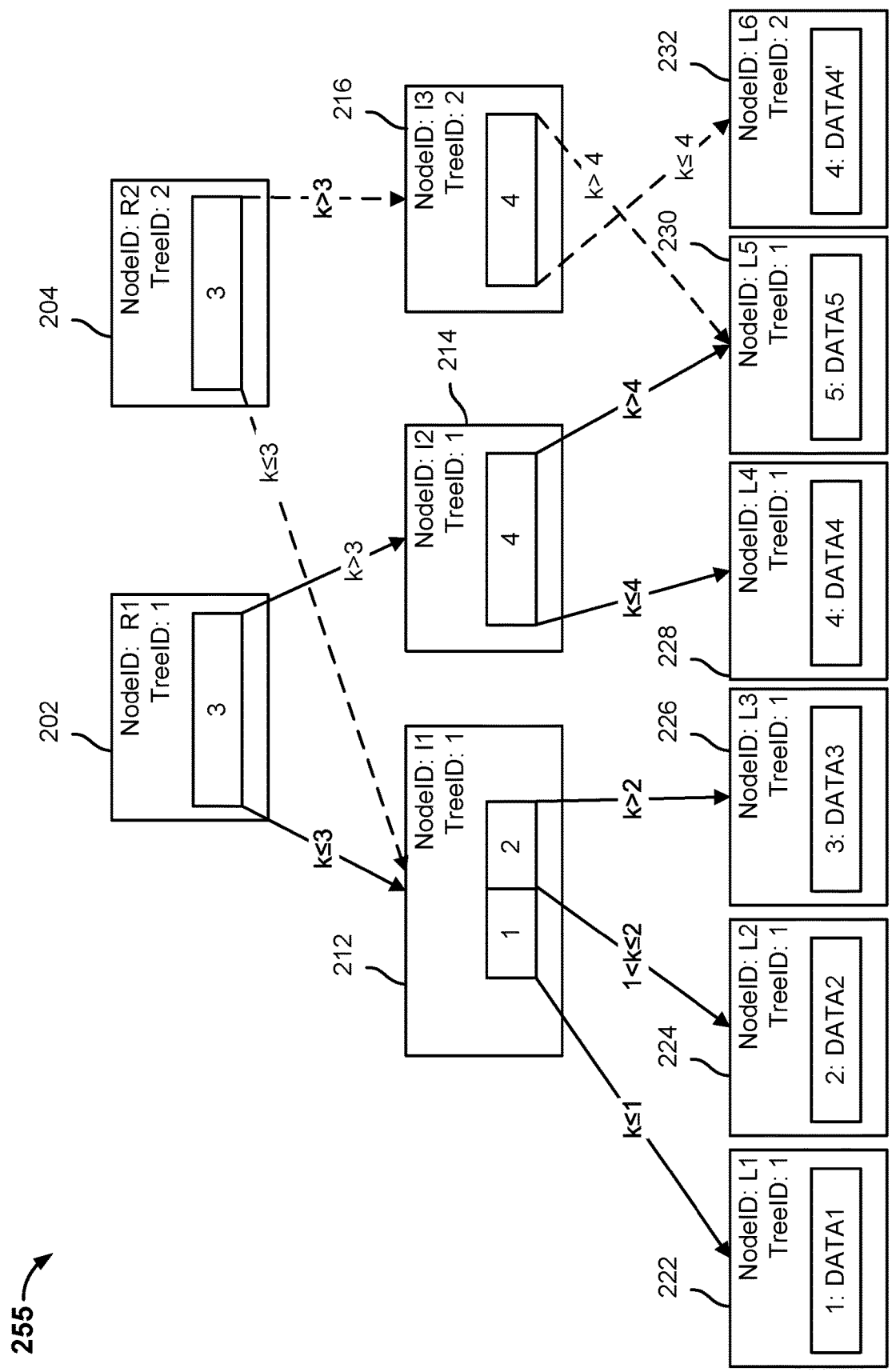
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a file system metadata snapshot tree as described with respect to FIG. 2C.

Figure 3A:
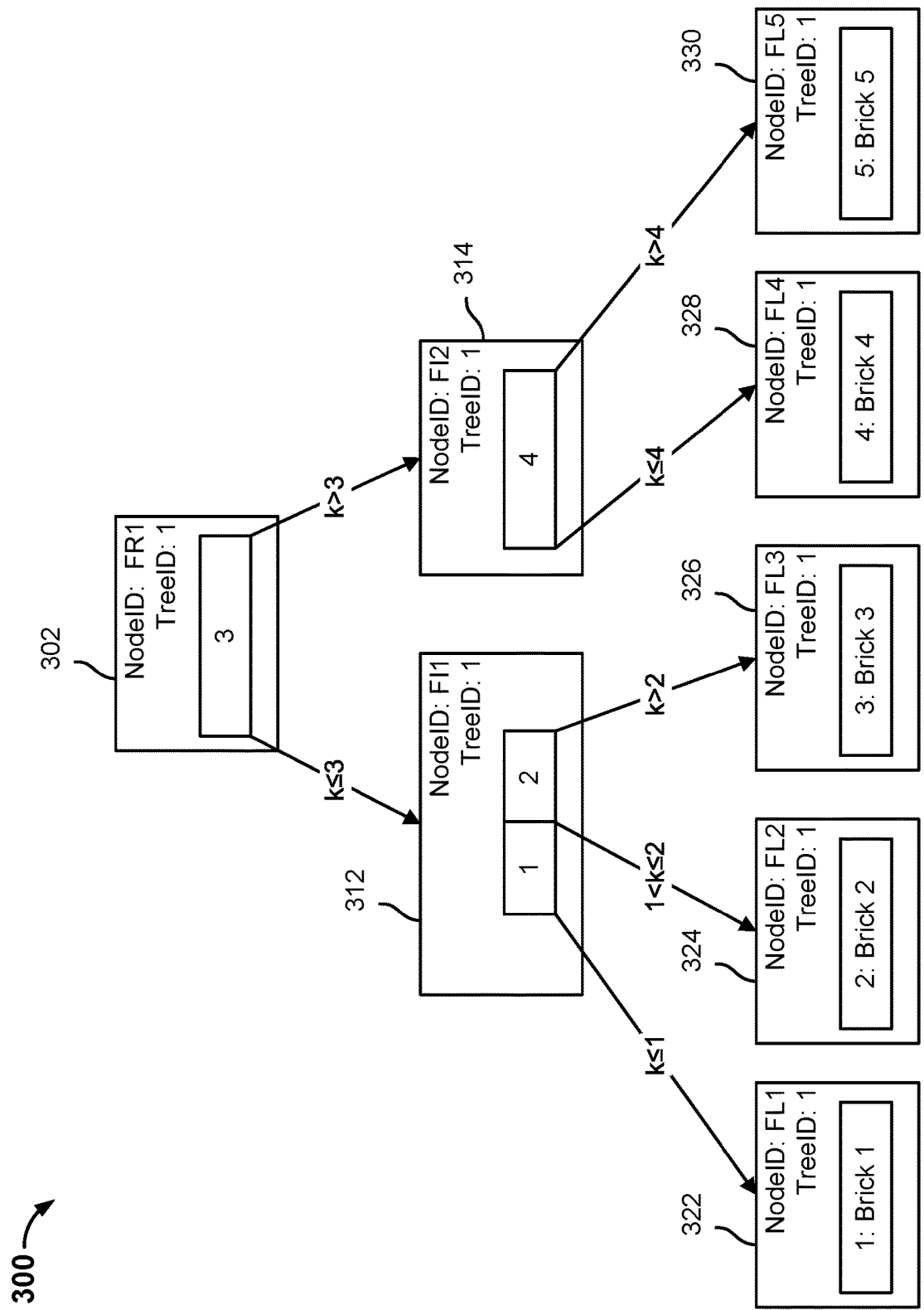
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. In the example shown, tree data structure 300 corresponds to a file and stores the metadata associated with the file. The metadata associated with a file is stored by a storage system as a file separate from the file with which the metadata is associated, that is, the tree data structure is stored separately from a file. A leaf node of a file system metadata snapshot tree associated with file system data, such as a leaf node of tree data structures 200, 250, 255, may include a pointer to a tree data structure corresponding to a content file, such as tree data structure 300. A tree data structure corresponding to a file (i.e., a "file metadata tree") may be used to organize the data blocks associated with a file that are stored on the storage system. Tree data structure 300 may be referred to as a "file metadata structure" or a "file metadata tree."

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time $t_0$. A tree data structure associated with file system data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar to the file system metadata snapshot trees described above, each node may include a "NodeID" that identifies the node and a "TreeID" that identifies a snapshot/view with which the node is associated.

In the example shown, root node 302 includes a pointer to intermediate node 312 and a pointer to intermediate node 314. Root node 302 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead to the node with a data key of "5."

Leaf node 322 includes a data key-value pair of "1: Brick 1." "Brick 1" is a brick identifier that identifies the data brick associated with one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick associated with one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick associated with one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick associated with one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick associated with one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A file may be comprised of a plurality of data chunks. A data brick may be associated with one or more chunk identifiers (e.g., SHA-1 hash value). A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree. A metadata store may include a data structure that matches a brick identifier with a corresponding location (physical location) of the one or more data chunks comprising the brick.

Figure 3B:
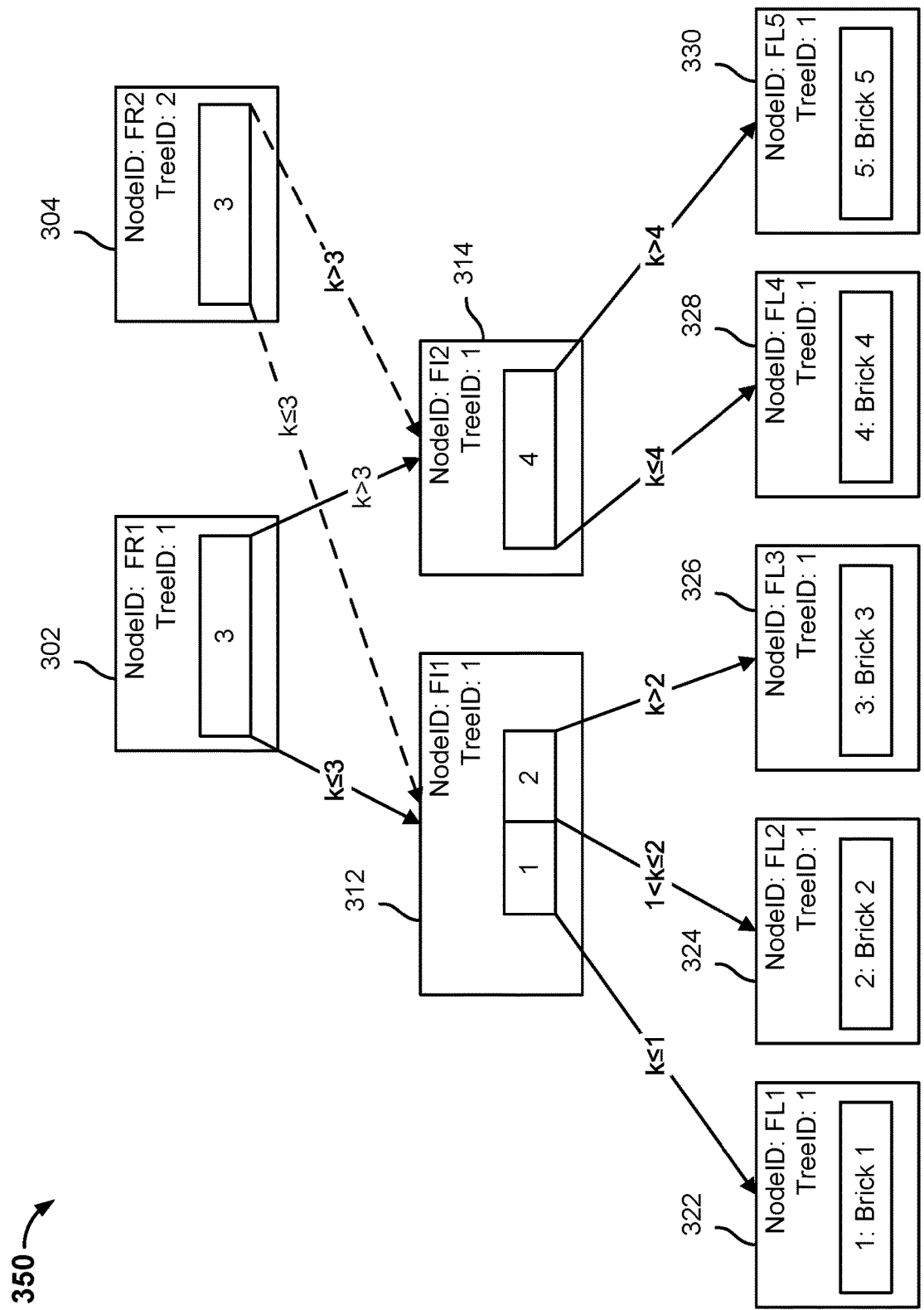
FIG. 3B is a block diagram illustrating an embodiment of cloning a file metadata tree.

FIG. 3B is a block diagram illustrating an embodiment of cloning a file metadata tree. In some embodiments, tree data structure 350 may be created by a storage system, such as storage system 112. A file metadata tree corresponding to a file may be cloned when an incremental backup snapshot that includes data associated with the file, is performed.

The tree data structure corresponding to a file can be used to capture different versions of the file (e.g., version of a file backed up from a primary system or a version of a file generated by a storage system) at different moments in time.

In some embodiments, the tree data structure allows a chain of file metadata trees corresponding to different versions of a file to be linked together by allowing a node of a later version of a file metadata tree to reference a node of a previous version of a file metadata tree. A file metadata tree may be comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the file system metadata snapshot tree structure, the file metadata tree structure allows different versions of file data to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a first file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330.

To create a snapshot of the file data at time t+n, a clone of the previous root node is created. The cloned root node includes the same set of pointers as the original node, but includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a snapshot with which the root node is associated. Root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In the example shown, root node 304 is a clone of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal to the node key indicates that traversing a file metadata tree included in tree data structure 350 from root node 304 to intermediate node 312 may lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 may lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
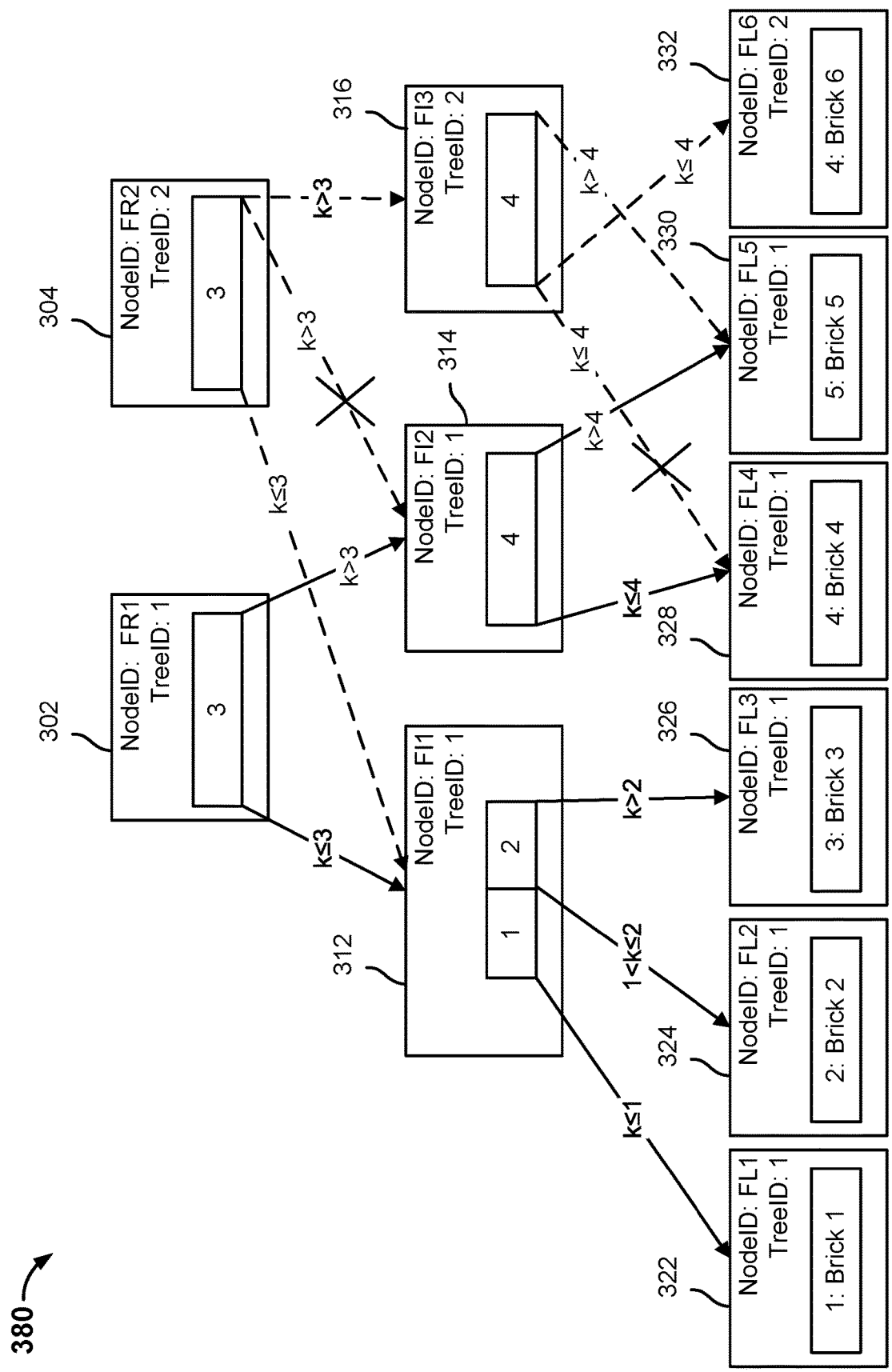
FIG. 3C is a block diagram illustrating an embodiment of modifying a cloned file metadata tree.

FIG. 3C is a block diagram illustrating an embodiment of modifying a cloned file metadata tree. In the example shown, tree data structure 380 may be modified by a file system manager, such as file system manager 117. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data are made. Tree data structure 380 may be modified to include data associated with a file that is included in an incremental backup snapshot.

In some embodiments, the file data may be modified such that one of the data chunks is replaced by another data chunk. When a data chunk of file data associated with a previous backup snapshot is replaced with a new data chunk, the data brick associated with the data chunk may be different. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager may traverse tree data structure 380 from root node 304 until it reaches a target leaf node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 (e.g., the shadow copy) includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

In some embodiments, when performing an incremental backup snapshot, a primary system includes all of the data associated with a file. The storage system may determine whether the data associated with a file is already stored in the storage system. In the event the data associated with the file is already stored in the storage system, for example, the data associated with leaf nodes 322, 324, 326, 330, the file metadata tree corresponding to the file may include references to the previously stored data. In the event the data associated with the file is not already stored in the storage system, for example, the data associated with leaf node 332, the file metadata tree corresponding to the file may be modified to include nodes to reference the new data.

Figure 3D:
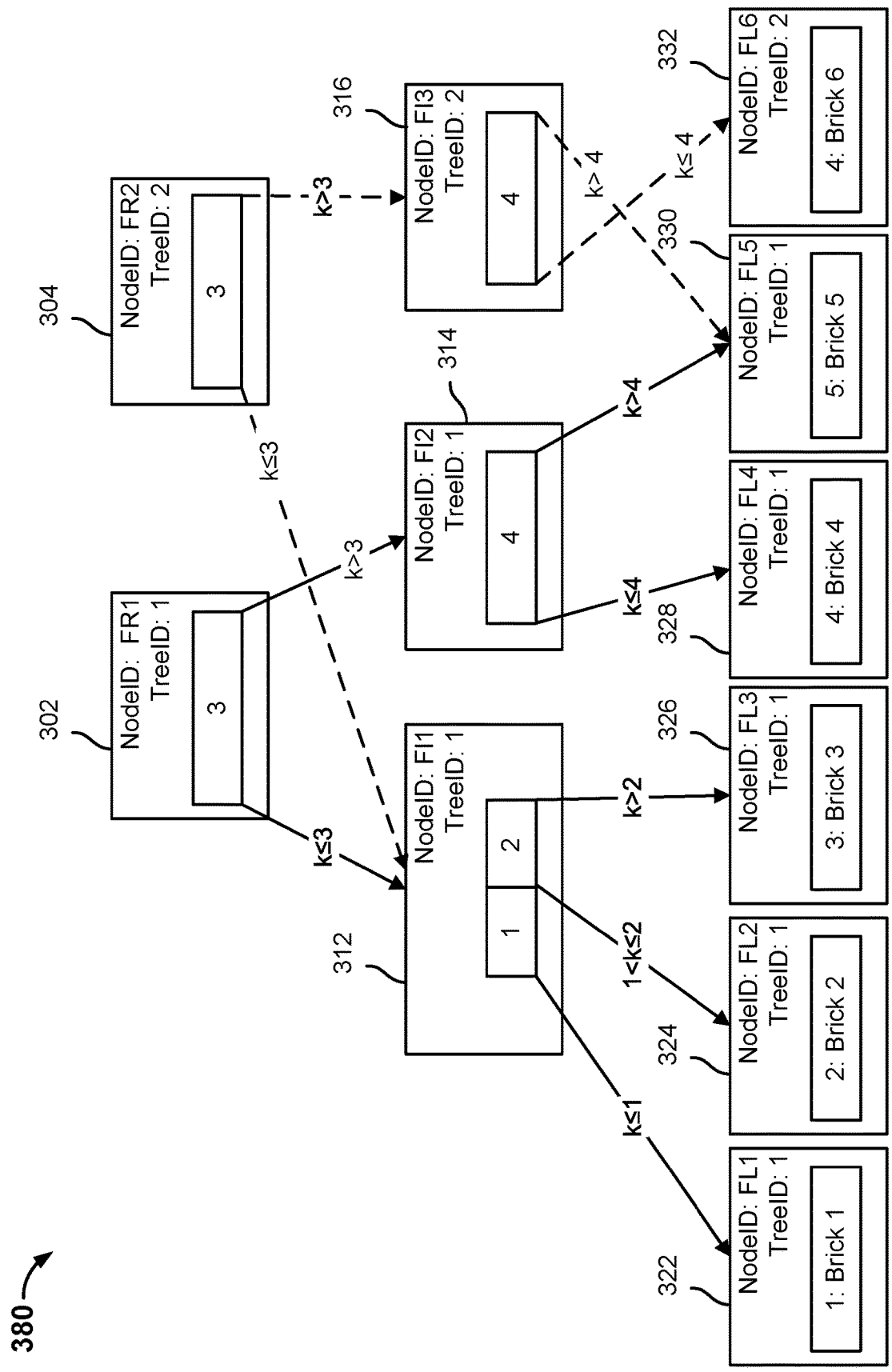
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4:
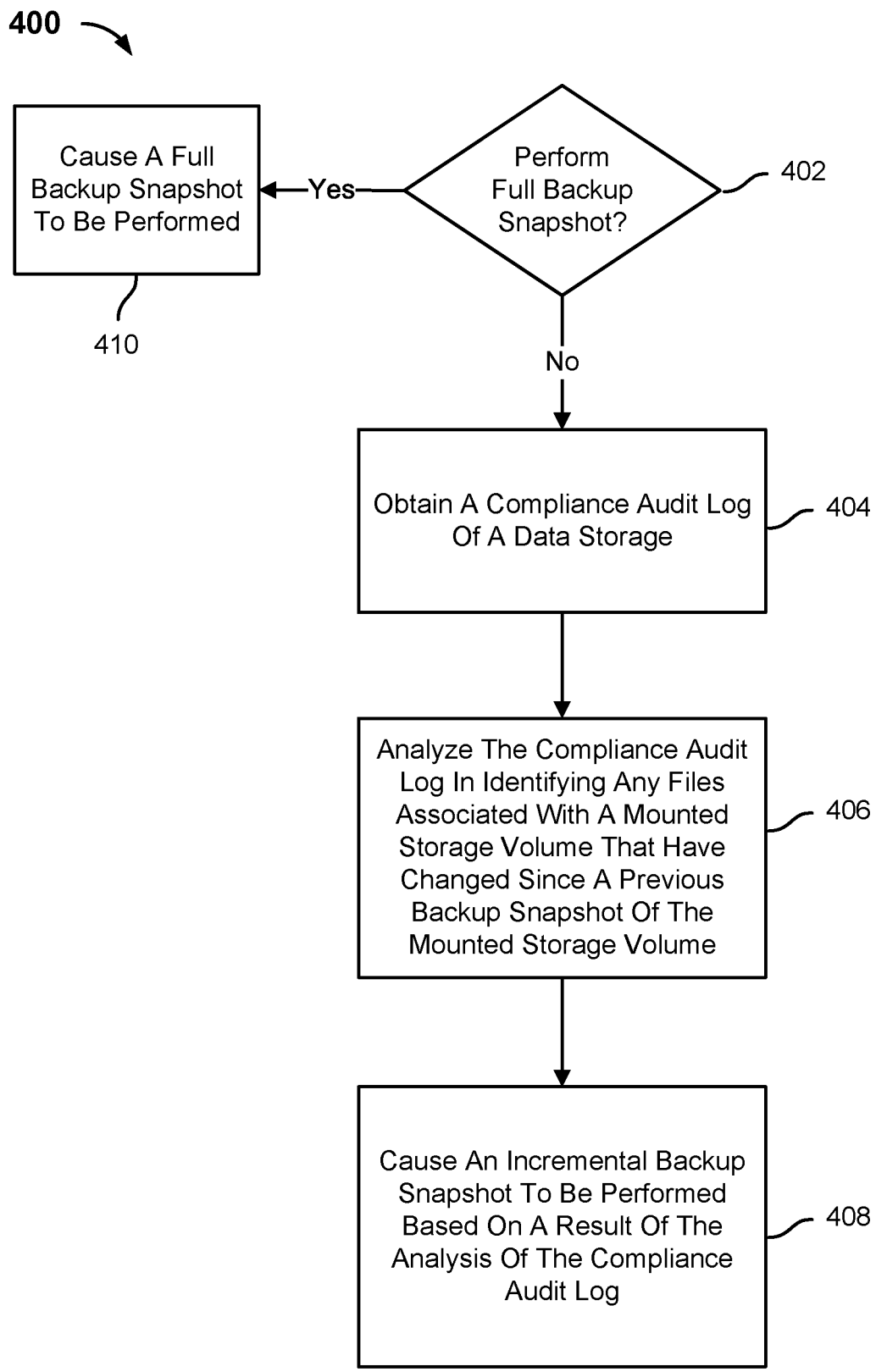
FIG. 4 is a flow chart illustrating a process for performing a backup in accordance with some embodiments.

FIG. 4 is a flow chart illustrating a process for performing a backup in accordance with some embodiments. In the example shown, process 400 may be performed by a backup client, such as backup client 107 or by a storage system, such as storage system 112.

At 402, it is determined whether to perform a full backup snapshot of a mounted storage volume. A full backup snapshot may include all of the file system data associated with a mounted storage volume. A full backup snapshot may be performed in the event the mounted storage volume has not been backed up before. In some embodiments, a full backup snapshot is performed after the mounted storage volume comes back online after being offline for a period of time. In the event it is determined that a full backup snapshot is to be performed, process 400 proceeds to 410. In the event it is determined that a full backup snapshot is not to be performed, process 400 proceeds to 404.

At 404, a compliance audit log of a data storage is obtained. The data storage may be comprised of one or more storage devices. Each storage device may store an associated compliance audit log. Each storage device may have one or more mounted storage volumes. A data storage may store a compliance audit log comprised of a plurality of entries. The compliance audit log may include entries for the one or more mounted storage volumes. The compliance audit log corresponding to the mounted storage volume to be backed up may be identified and obtained.

An entry of the compliance audit log may include information, such as a timestamp, an event type (e.g., read, write, delete, etc.), a user associated with the event, a file associated with the event, an identification of a device used, etc. The compliance audit log may include other information about the primary system, such as when a user associated with the primary system has logged in, the number of failed login attempts associated with a device, the last time a software update was performed, the last time a password was changed, etc.

In some embodiments, a storage system to which the one or more files are to be backed up, may remotely access the compliance audit log. In some embodiments, a backup client associated with the storage system may access the compliance audit log.

At 406, the compliance audit log is analyzed in identifying any files associated with a mounted storage volume that have changed since a previous backup snapshot of the mounted storage volume. In some embodiments, the previous backup snapshot is a full backup of the data storage. In other embodiments, the previous backup snapshot is an incremental backup of the data storage.

A previous backup snapshot of the mounted storage volume has an associated timestamp. The compliance audit log may be analyzed to identify one or more entries with corresponding timestamps that are later than the timestamp associated with the previous backup snapshot of the mounted storage volume. A compliance audit log may store entries for a plurality of mounted storage volumes. For the entries with a timestamp that is later than the timestamp associated with the previous backup of the mounted storage volume, the entries may be further analyzed to determine if the entry is associated with the mounted storage volume to be backed up. An entry may indicate the mounted storage volume to which it is associated. For the one or more entries that are associated with the mounted storage volume to be backed up, the entries may be further analyzed to determine if the entry is a write file system operation. An entry corresponding to a write file system operation with a timestamp that is later than the timestamp associated with the previous backup snapshot of the mounted storage volume may correspond to a file that was modified or added to the mounted storage volume after the previous backup of the mounted storage volume.

In some embodiments, the one or more identified entries include entries that occurred within a threshold time (e.g., five minutes) before the previous backup snapshot of the mounted storage volume. One or more file system write operations may have been in-flight while the previous backup snapshot was being performed (e.g., the file system write operations were not committed). The one or more identified entries may include entries that occurred within the threshold time before the previous backup snapshot of the mounted storage volume to ensure that these in-flight file system write operations are included in the backup snapshot of the mounted storage system.

In some embodiments, a file associated with a mounted storage volume to be backed up has been modified more than one time since a previous backup snapshot of the mounted storage volume. The compliance audit log may include multiple entries for this file. Instead of including multiple instances of the file in the files to be included in an incremental backup of the mounted storage volume, a list of files to be included in an incremental backup of the mounted storage volume may include a single instance of the file.

In some embodiments, the metadata associated with a file has changed and the data associated with the file has not changed. For example, a name of the file may have changed.

At 408, an incremental backup snapshot based on a result of the analysis of the compliance audit log is caused to be performed. The incremental backup snapshot may include the data associated with a modified and/or added file. In some embodiments, the incremental backup snapshot includes a portion of the identified file that was not previously backed up. In some embodiments, the incremental backup includes an entire portion of the identified file that was not previously backed up.

The backup client associated with the storage system may cause a primary system that includes the data storage to perform an incremental backup snapshot to include the data associated with the one or more identified files. In some embodiments, the storage system to which the one or more identified files are to be backed up sends to the backup client associated with the storage system a request for the one or more identified files. In response to the request, the backup client associated with the storage system may send to the primary system a command to perform an incremental backup snapshot that includes the one or more identified files.

In some embodiments, the backup client associated with the storage system identifies the one or more files and sends to the primary system a command to perform an incremental backup snapshot that includes the one or more identified files. In response to receiving the command, the primary system may be configured to perform an incremental backup snapshot.

At 410, a full backup snapshot is caused to be performed. The full backup snapshot may include all of the file system data associated with the mounted storage volume to be backed up.

Figure 5:
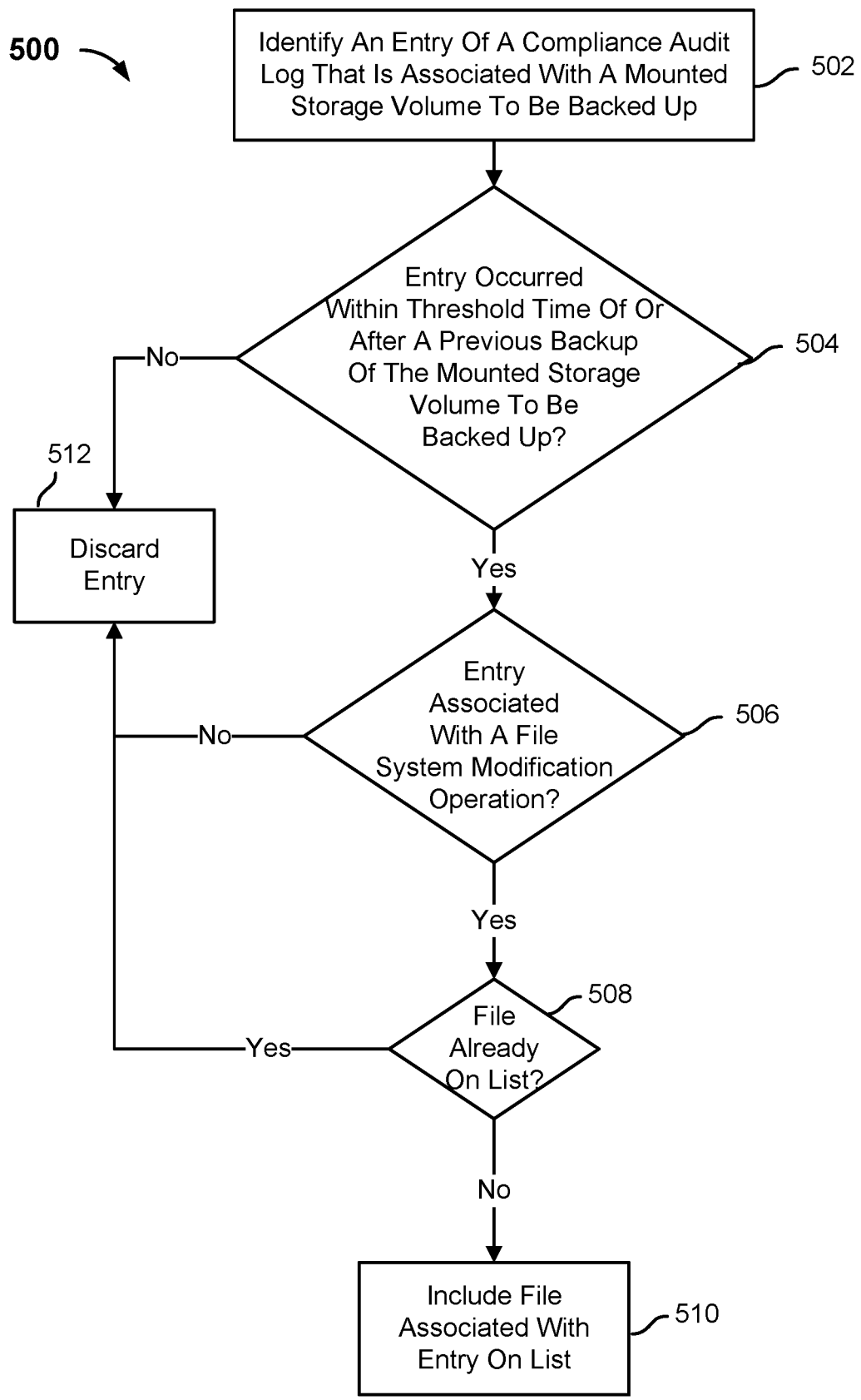
FIG. 5 is a flow chart illustrating a process for analyzing a compliance audit log in accordance with some embodiments.

FIG. 5 is a flow chart illustrating a process for analyzing a compliance audit log in accordance with some embodiments. In the example shown, process 500 may be implemented by a backup client, such as backup client 107 or a storage system, such as storage system 112. In some embodiments, process 500 is implemented to perform some or all of step 406 of process 400. Process 500 may be performed for each entry included in a compliance audit log associated with a mounted storage volume to be backed up.

At 502, an entry of a compliance audit log that is associated with a mounted storage volume to be backed up is identified. A compliance audit log may store entries for a plurality of mounted storage volumes. Each entry may include information that identifies a mounted storage volume to which the entry is associated. An entry of the compliance audit log may be identified as being associated with the mounted storage volume to be backed up in the event the entry includes information that identifies the mounted storage volume to be backed up.

At 504, it is determined whether the entry occurred within a threshold time of or after a previous backup of the mounted storage volume to be backed up. An entry may have an associated timestamp. The previous backup of the mounted storage volume may have an associated timestamp. The timestamp associated with the entry may be compared with the timestamp associated with the previous backup of the mounted storage volume to determine whether the entry occurred within a threshold time of or after a previous backup of the mounted storage volume to be backed up.

The timestamp associated with an entry may be compared to the timestamp associated with the previous backup of the mounted storage volume. One or more file system write operations may have been in-flight while the previous backup snapshot was being performed (e.g., the file system write operations were not committed). An entry that occurred within a threshold time before the previous backup snapshot of the mounted storage volume may have been excluded from the previous backup snapshot. To ensure that these in-flight file system write operations are included in at least one backup snapshot of the mounted storage volume system, it is determined if the timestamp associated with the entry occurred after the previous backup snapshot or within a threshold time of the previous backup of the mounted storage volume to be backed up.

In the event the entry occurred after or within a threshold time of a previous backup of the mounted storage volume to be backed up, process 500 proceeds to 506. In the event the entry did not occur after or within a threshold time of the previous backup of the mounted storage volume to be backed up, process 500 proceeds to 512 and the entry is discarded.

At 506, it is determined whether the entry is associated with a file system modification operation. The compliance audit log associated with a mounted storage volume to be backed up may include a plurality of entries. For example, the compliance audit log may include an entry associated with a user login, the number of failed login attempts associated with a device, the last time a software update was performed, the last time a password was changed, etc. The compliance audit log may also include entries associated with file system operations, such as read, write, or delete.

A file system modification operation may modify the data associated with a file. In some embodiments, a file system modification operation modifies a location of a file. In some embodiments, a file system modification operation modifies the metadata associated with a file (e.g., file name change).

In the event the entry is associated with a file system modification operation, process 500 proceeds to 508. In the event the entry is not associated with a file system modification operation, process 500 proceeds to 512 and the entry is discarded.

At 508, it is determined if a file associated with the entry is already on the list of one or more files to be included in an incremental backup snapshot. A file may have been modified more than once since the previous backup snapshot. In the event the file is already on the list of one or more files to be included in an incremental backup snapshot, process 500 proceeds to 512 and the entry is discarded. This reduces the size of the list of one or more files to be included in the incremental backup snapshot and reduces the number of times that process 500 needs to be performed.

In the event the file is not already on the list of one or more files to be included in an incremental backup snapshot, process 500 proceeds to 510 and the file associated with the entry is included on the list of one or more files to be included in an incremental backup snapshot.

Figure 6:
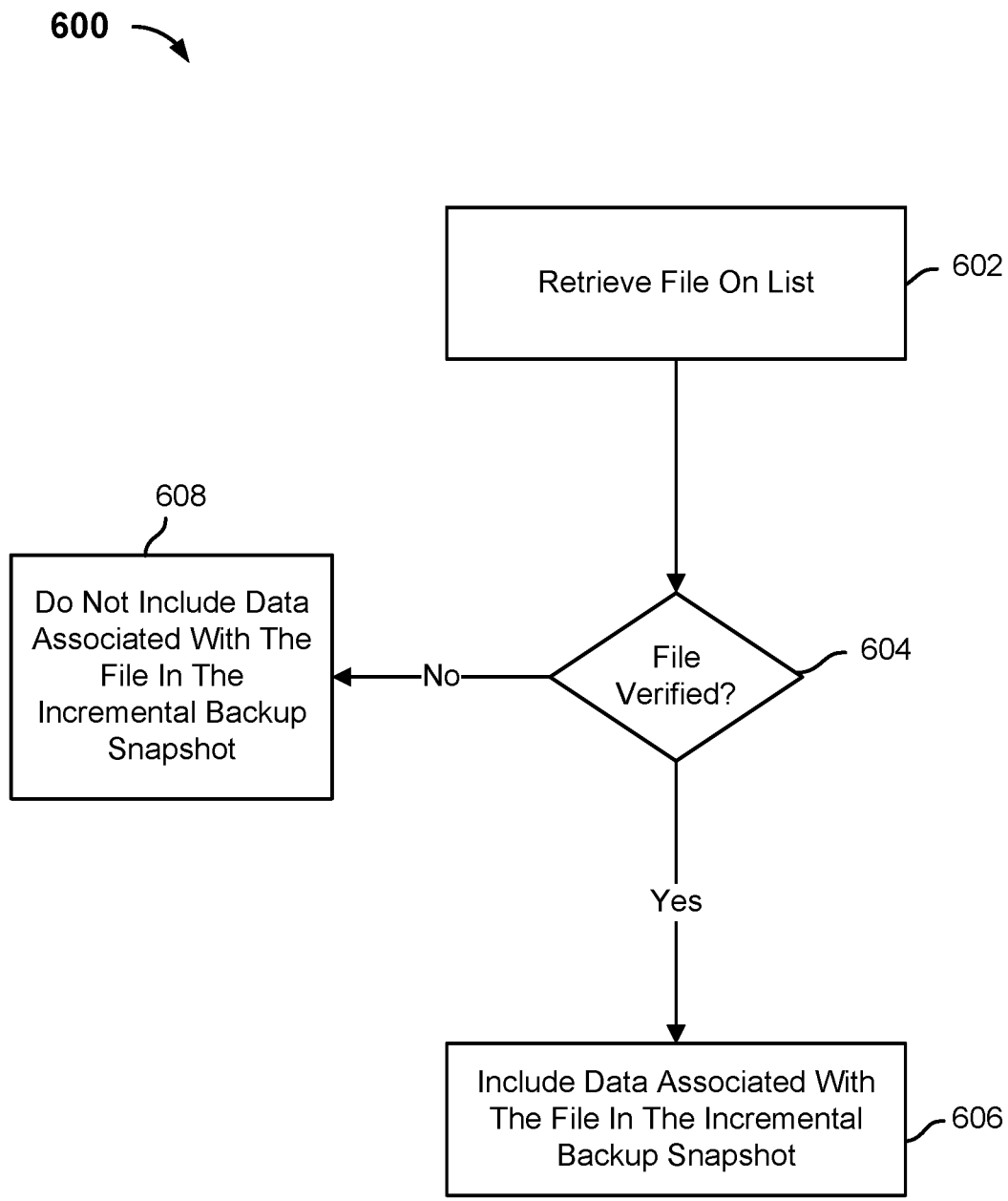
FIG. 6 is a flow chart illustrating a process for verifying a file to be included in an incremental backup snapshot in accordance with some embodiments.

FIG. 6 is a flow chart illustrating a process for verifying a file to be included in an incremental backup snapshot in accordance with some embodiments. In the example shown, process 600 may be implemented by a backup client, such as backup client 107 or a storage system, such as storage system 112. In some embodiments, process 600 is implemented to perform some of step 406 of process 400. Process 600 may be performed for each file included in a list of files to be included in an incremental backup snapshot.

At 602, a file included on a list of files to be included in an incremental backup snapshot is retrieved. A compliance audit log may be analyzed to determine one or more files to be included in an incremental backup snapshot of a mounted storage volume.

At 604, it is verified whether the file has actually been modified or added to the mounted storage volume since the previous backup snapshot of the mounted storage volume. In some embodiments, the file is verified as having been modified or added to the mounted storage volume since the previous backup snapshot of the data storage. In other embodiments, the file is not verified as having been modified or added to the mounted storage volume since the previous backup snapshot of the mounted storage volume.

The file may be verified by analyzing the metadata associated with the file. In some embodiments, in the event the metadata associated with the file is determined to have changed since a previous backup snapshot, the file is verified as being modified since the previous backup snapshot. In some embodiments, in the event the metadata associated with the file is determined not to have changed since a previous backup snapshot, the file is not verified as being modified since the previous backup snapshot. The metadata associated with a file may include a modification timestamp and/or a creation timestamp. In some embodiments, in the event the modification time stamp associated with a file is after the timestamp associated with the previous backup snapshot, the file is verified as being modified since a previous backup snapshot. In some embodiments, in the event the modification time stamp associated with a file is not after the timestamp associated with the previous backup snapshot, the file is not verified as being modified since a previous backup snapshot.

In the event the creation time stamp associated with a file is after the timestamp associated with the previous backup snapshot, the file is verified as being created since a previous backup snapshot. In the event the creation time stamp associated with a file is not after the timestamp associated with the previous backup snapshot, the file is not verified as being created since a previous backup snapshot.

The file may be verified by analyzing one or more attributes associated with a file (e.g., name, location, number of hard links, size, protocol specific attributes, etc.). A record of the one or more attributes associated with a file may be maintained. For example, an inode of the mounted storage volume may store the one or more attributes associated with a file. The one or more attributes associated with the file at a time when the previous backup snapshot was performed may be stored. The one or more attributes associated with the file when the previous backup snapshot was performed may be compared to the one or more attributes associated with the file when a current backup snapshot is performed. In the event any of the attributes associated with the file have changed since the previous backup snapshot, the file is verified as being modified since a previous backup snapshot. In the event none of the attributes associated with the file have changed since the previous backup snapshot, the file is not verified as being modified since the previous backup snapshot.

In the event the file is verified, process 600 proceeds to 606. In the event the file is not verified, process 600 proceeds to 608. At 606, the data associated with the file is included in the incremental backup snapshot. At 608, the data associated with the file is not included in the incremental backup snapshot.

Figure 7:
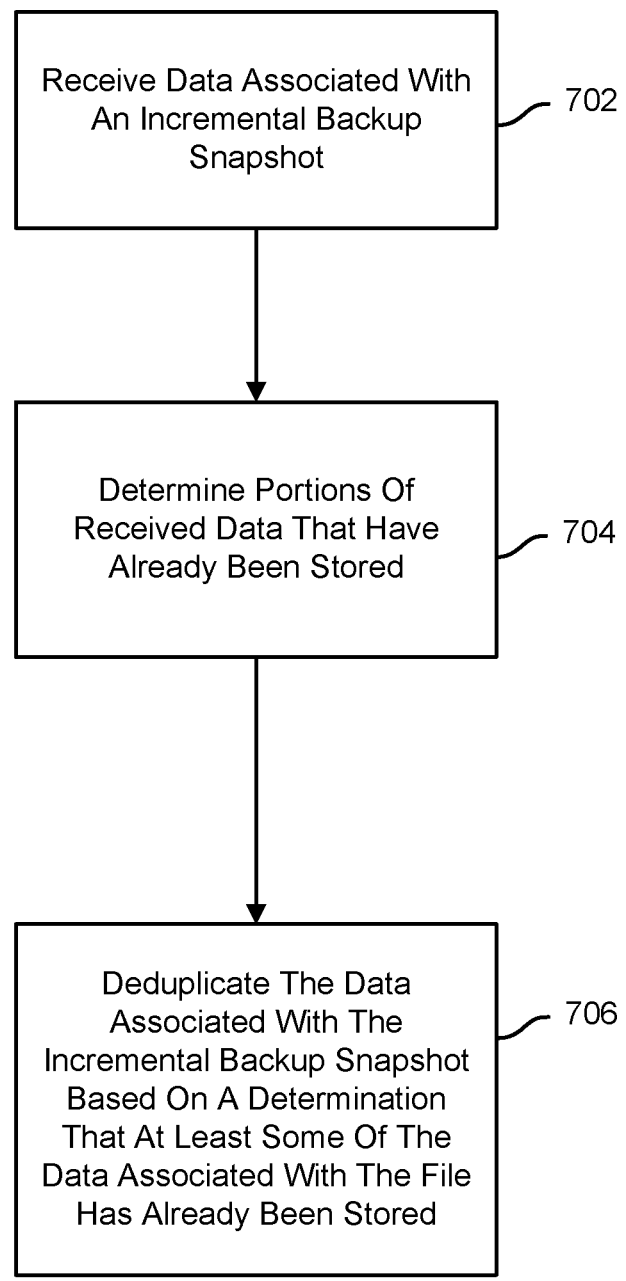
FIG. 7 is a flow chart illustrating a process for deduplicating data in accordance with some embodiments.

FIG. 7 is a flow chart illustrating a process for deduplicating data in accordance with some embodiments. In the example shown, process 700 may be performed by a storage system, such as storage system 112.

At 702, data associated with an incremental backup snapshot is received. The incremental backup snapshot may include data associated with one or more files associated with a mounted storage volume that were modified since a previous backup snapshot of the mounted storage volume. Some of the data included in the incremental backup snapshot may already be stored on the storage system. Some of the data included in the incremental backup snapshot may not already be stored on the storage system.

At 704, the portions of the file that have already been stored are determined. The storage system may divide the data associated with the one or more files into a plurality of data chunks. The storage system may assign corresponding chunk identifiers to the data chunks. The storage system may compare the corresponding chunk identifier to chunk identifiers included in the one or more data structures stored in a metadata store of the storage system. The one or more data structures may associate chunk identifiers with files that are already stored on the storage system.

At 706, the data associated with the incremental backup snapshot is deduplicated based on the determined portions of data that have already been stored. In the event the corresponding chunk identifier is not already stored in the one or more data structures, the data chunk is retained and the file metadata structure associated with the file is updated to include a leaf node that stores a brick identifier associated with the corresponding chunk identifier. In the event the corresponding chunk identifier is already stored in the one or more data structures, the data chunk is discarded and the file metadata structure associated with the file is updated to include a reference to a node associated with the previously stored data chunk.

This may prevent duplicate copies of a data chunk from being stored on the storage system because instead of storing a duplicate copy of a data chunk, the storage system stores a reference to the duplicate data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining a compliance audit log of a data storage, wherein the compliance audit log stores a plurality of entries associated with a plurality of mounted storage volumes, wherein the plurality of entries include one or more modification entries associated with the plurality of mounted stored volumes and one or more non-modification entries associated with the plurality of mounted storage volumes;
   analyzing the compliance audit log to identify one or more files associated with a mounted storage volume that have changed since a previous backup snapshot of the mounted storage volume associated with the data storage, wherein analyzing the compliance audit log includes:
   identifying one or more entries associated with the mounted storage volume from the plurality of entries associated with the plurality of mounted storage volumes;
   identifying, from the one or more identified entries associated with the mounted storage volume, one or more modification entries associated with the mounted storage volume;
   determining whether the one or more identified modification entries occurred within a threshold time of or after a previous backup of the mounted storage volume; and
   determining that the one or more identified modification entries include one or more entries that occurred within the threshold time before the previous backup of the mounted storage volume and one or more entries that occurred after the previous backup of the mounted storage volume; and
   causing an incremental backup snapshot of the mounted storage volume to be performed based on the one or more entries that occurred within the threshold time before the previous backup of the mounted storage volume and the one or more entries that occurred after the previous backup of the mounted storage volume.

2. The method of claim 1, wherein at least one of the one or more modification entries is associated with a file system write operation.

3. The method of claim 1, wherein the data storage is a network-attached storage.

4. The method of claim 1, wherein the data storage is associated with a plurality of mounted storage volumes, wherein the mounted storage volume is one of the plurality of mounted storage volumes.

5. The method of claim 1, wherein analyzing the compliance audit log to identify one or more files associated with a mounted storage volume that have changed since a previous backup snapshot of the mounted storage volume associated with the data storage further comprises determining that the one or more identified modification entries are associated with a file system modification operation.

6. The method of claim 5, wherein analyzing the compliance audit log to identify one or more files associated with a mounted storage volume that have changed since a previous backup snapshot of the mounted storage volume associated with the data storage further comprises determining that the one or more identified modification entries are associated with a file system modification operation that is a write operation.

7. The method of claim 6, wherein analyzing the compliance audit log to identify one or more files associated with a mounted storage volume that have changed since a previous backup snapshot of the mounted storage volume associated with the data storage further comprises determining that a file associated with one of the identified entries is not already on a list of one or more files to be included in the incremental backup snapshot.

8. The method of claim 7, wherein analyzing the compliance audit log to identify one or more files associated with a mounted storage volume that have changed since a previous backup snapshot of the mounted storage volume associated with the data storage further comprises including the file associated with the one of the identified entries on the list of one or more files to be included in the incremental backup snapshot.

9. The method of claim 8, wherein analyzing the compliance audit log to identify one or more files associated with a mounted storage volume that have changed since a previous backup snapshot of the mounted storage volume associated with the data storage further comprises verifying that the file included on the list of one or more files to be included in an incremental backup snapshot has changed since the previous backup snapshot.

10. The method of claim 9, wherein verifying that the file has changed since the previous backup snapshot comprises inspecting metadata associated with the file.

11. The method of claim 10, wherein the metadata associated with the file includes a modification timestamp.

12. The method of claim 9, wherein the data associated with the verified file is included in the incremental backup snapshot.

13. The method of claim 1, wherein the incremental backup snapshot includes a portion of an identified file that was not previously backed up.

14. The method of claim 1, wherein the incremental backup snapshot includes an entire portion of an identified file.

15. The method of claim 1, wherein data associated with the incremental backup snapshot is provided to a storage system, wherein the storage system is configured to deduplicate the data included in the incremental backup snapshot.

16. A computer program product, the computer program product being embodied in a non-transitory computer readable storage medium and comprising computer instructions for:
- obtaining a compliance audit log of a data storage, wherein the compliance audit log stores a plurality of entries associated with a plurality of mounted storage volumes, wherein the plurality of entries include one or more modification entries associated with the plurality of mounted stored volumes and one or more non-modification entries associated with the plurality of mounted storage volumes;
- analyzing the compliance audit log in identifying any files associated with a mounted storage volume that have changed since a previous backup snapshot of the mounted storage volume associated with the data storage, wherein analyzing the compliance audit log includes:
- identifying one or more entries associated with the mounted storage volume from the plurality of entries associated with the plurality of mounted storage volumes;
- identifying, from the one or more identified entries associated with the mounted storage volume, one or more modification entries associated with the mounted storage volume;
- determining whether the one or more identified modification entries occurred within a threshold time of or after a previous backup of the mounted storage volume; and
- determining that the one or more identified modification entries include one or more entries that occurred within the threshold time before the previous backup of the mounted storage volume and one or more entries that occurred after the previous backup of the mounted storage volume; and
- causing an incremental backup snapshot of the mounted storage volume to be performed based on the one or more entries that occurred within the threshold time before the previous backup of the mounted storage volume and the one or more entries that occurred after the previous backup of the mounted storage volume.

17. A system, comprising:
a processor configured to:
obtain a compliance audit log of a data storage, wherein the compliance audit log stores a plurality of entries associated with a plurality of mounted storage volumes, wherein the plurality of entries include one or more modification entries associated with the plurality of mounted stored volumes and one or more non-modification entries associated with the plurality of mounted storage volumes;
analyze the compliance audit log to identify one or more files associated with a mounted storage volume that have changed since a previous backup snapshot of the mounted storage volume associated with of the data storage, wherein to analyze the compliance audit log, the processor is configured to:
identify one or more entries associated with the mounted storage volume from the plurality of entries associated with the plurality of mounted storage volumes;
identify, from the one or more identified entries associated with the mounted storage volume, one or more modification entries associated with the mounted storage volume;
determine whether the one or more identified modification entries occurred within a threshold time of or after a previous backup of the mounted storage volume; and
determine that the one or more identified modification entries include one or more entries that occurred within the threshold time before the previous backup of the mounted storage volume and one or more entries that occurred after the previous backup of the mounted storage volume; and
cause an incremental backup snapshot of the mounted storage volume to be performed based on the one or more entries that occurred within the threshold time before the previous backup of the mounted storage volume and the one or more entries that occurred after the previous backup of the mounted storage volume; and
a memory coupled to the processor and configured to provide the processor with instructions.

* * * * *